United States Patent
Swenson

(10) Patent No.: US 7,606,249 B1
(45) Date of Patent: Oct. 20, 2009

(54) METHODS AND SYSTEMS FOR CACHING PACKETS TO BE WRITTEN TO OR READ FROM PACKET MEMORY

(75) Inventor: Erik R. Swenson, San Jose, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 576 days.

(21) Appl. No.: 11/018,132

(22) Filed: Dec. 21, 2004

(51) Int. Cl.
*H04L 12/56* (2006.01)
(52) U.S. Cl. .................. 370/412; 370/429; 711/119
(58) Field of Classification Search ............... 370/229, 370/230, 230.1, 231, 235, 412–418, 428, 370/429; 709/223, 224; 711/118, 119
See application file for complete search history.

(56) References Cited

U.S. PATENT DOCUMENTS

| | | | | |
|---|---|---|---|---|
| 5,502,833 A | * | 3/1996 | Byrn et al. ................. | 711/132 |
| 6,295,299 B1 | | 9/2001 | Haddock et al. | |
| 6,892,285 B1 | * | 5/2005 | Key et al. ................... | 711/154 |
| 7,035,212 B1 | * | 4/2006 | Mittal et al. ................ | 370/230 |
| 7,190,674 B2 | * | 3/2007 | Kobayakawa et al. ....... | 370/235 |
| 7,266,120 B2 | * | 9/2007 | Cheng et al. ................ | 370/390 |
| 7,295,553 B2 | * | 11/2007 | Saitoh ....................... | 370/392 |
| 7,486,688 B2 | * | 2/2009 | Barrack et al. ............. | 370/412 |

\* cited by examiner

*Primary Examiner*—Pankaj Kumar
*Assistant Examiner*—Duc T Duong
(74) *Attorney, Agent, or Firm*—Jenkins, Wilson, Taylor & Hunt, P.A.

(57) ABSTRACT

Methods and systems for caching packets to improve utilization of packet memory are disclosed. In one method, packets to be written to a packet memory are accumulated in write caches on an egress queue basis. That is, each write cache stores packets corresponding to an egress queue in the system. When one of the queues has a size that corresponds to a burst length of the packet memory, the packets are written from the queue to the packet memory. Packets are read from the packet memory to read caches. Subsequent accesses to packets stored in the read caches avoid the need to access the packet memory.

33 Claims, 9 Drawing Sheets

METHODS AND SYSTEMS FOR CACHING PACKETS TO BE WRITTEN TO OR READ FROM PACKET MEMORY

TECHNICAL FIELD

The subject matter disclosed herein relates to methods and systems for caching packets. More particularly, the subject matter disclosed herein relates to methods and systems and caching packets to improve utilization of a packet memory.

BACKGROUND ART

Packet forwarding devices, such as layer 2 switches and layer 3 routers, utilize memory devices to store packets before they are sent to their intended destinations. In general, a packet forwarding device includes ports and a switch fabric for switching packets between ports. In a shared memory switch fabric architecture, a packet arrives at one port and is classified to an egress queue in the shared memory associated with the port to which the packet will be forwarded. A scheduler schedules packets to be dequeued and sent to the destination port using a scheduling algorithm. The scheduling algorithm may be based on any suitable criteria, such as first-in-first-out, quality of service, etc.

The memories used in packet forwarding devices are selected to meet the bandwidth requirements of the system. For example such memories must have access times that are at least on the order of line rates at which packets are sent to the packet forwarding devices. Due to current network bandwidth demands, packet forwarding devices typically high-speed static random access memories (SRAMs) for main packet memory.

One problem with using high-speed SRAMs for main memory in a packet forwarding device is that high-speed SRAMs are expensive when compared to other types of memory, such as dynamic random access memories (DRAMs). Thus, it may be desirable to use memory chips that have long burst lengths or slower random access times in order to reduce the cost of buffer memory in packet forwarding devices. The random access time of a memory is the minimum time period between which accesses to random memory locations can occur. The burst length of a memory refers to the minimum amount of data that can be written to or read from the memory during a single write or read cycle. Memories with longer burst lengths and slower random access times can be used to achieve the same bandwidth as faster SRAMs. However, inefficiencies can result. For example, one inefficiency that can result in operating a long burst length memory is that on the write side, packets may be smaller than the burst length of the memory. Thus, during a single write cycle, if a single packet is written to the memory, the packet may only use a portion of the burst length, thus making the write operation inefficient. Similarly, on the read side, if it is desirable to read a single packet from the memory and the packet size is less than the burst length of the memory, unneeded data will be read from the memory in order to extract the desired data.

While over-clocking a long burst length memory can be used to achieve a desired data rate. The memory may not be capable of operating at a sufficiently rapid rate if the burst length of the memory is much greater than the average packet size. For example, over-clocking may be used to achieve the desired data rate in instances in which the burst length is less than an order of magnitude greater than the average packet size. However, if the burst length is an order of magnitude or greater than the average packet size, over-clocking cannot be used to compensate for the inefficiency because the memory may not be fast enough to achieve the desired bandwidth.

One partial solution to these problems associated with using long burst length, slow random access time memories in packet forwarding devices is to use interleaving. That is, the packet memory can be organized in banks and packets may be alternatingly written to and read from the different banks of the memory. The random access time of a memory is typically faster if different banks of the memory are alternatingly accessed. While interleaving packets is possible on the write side, it is difficult to implement interleaving on the read side. For example, in a network switch, packets may be alternatingly written to different memory banks by a packet classifier. However, because packets are scheduled or dequeued based on criteria unrelated to memory banks, there is no guarantee that one packet will be read from a different memory bank than a previous packet. Thus, read operations from the packet memory will likely suffer the same underutilization inefficiency described above for the general case.

Accordingly, in light of these difficulties associated with conventional packet memories, there exists a need for methods and systems for caching packets to improve utilization of a packet memory.

SUMMARY

According to one aspect, the subject matter described herein includes methods and systems for caching packets to improve utilization of a packet memory. In one exemplary method, packets may be accumulated in write caches on an egress queue basis. Packets may be maintained in each of the write caches until a burst size associated with a main packet memory is achieved. When the burst size is achieved, the packets are written to main memory.

A system for caching packets to improve utilization of a packet memory includes a packet classifier that classifies packets to one or more egress queues. A cache manager controls accumulation of packets in a plurality of write caches corresponding to the egress queues. When one of the egress queues reaches a burst size corresponding to a burst size of a packet memory, the cache manager writes the packets to the packet memory.

On the read side, a scheduler schedules packets to be dequeued and sent to an output port. When the scheduler schedules a particular packet, a burst size of packets is written from the packet memory to a read cache. The packet is then read from the read cache and sent to an output port. When a second packet associated with the same burst is scheduled, rather than accessing the packet memory, the read cache is accessed. As a result, a second inefficient access to the packet memory is avoided. Thus, by controlling the caching of packets written to or read from the packet memory, the present invention allows more efficient utilization of the packet memory.

The methods and systems described herein for caching packets to improve utilization of a packet memory may be implemented in hardware, software, firmware, or any combination thereof. In one exemplary implementation, a method for caching packets to improve utilization of a packet memory may be implemented using computer executable instructions embodied in a computer-readable medium. Exemplary computer-readable media suitable for implementing such a method may include chip memory devices, integrated memory devices, optical and magnetic disk storage devices.

BRIEF DESCRIPTION OF THE DRAWINGS

Preferred embodiments of the subject matter described herein will now be explained with reference to the accompanying drawings of which.

DETAILED DESCRIPTION

Figure 1:
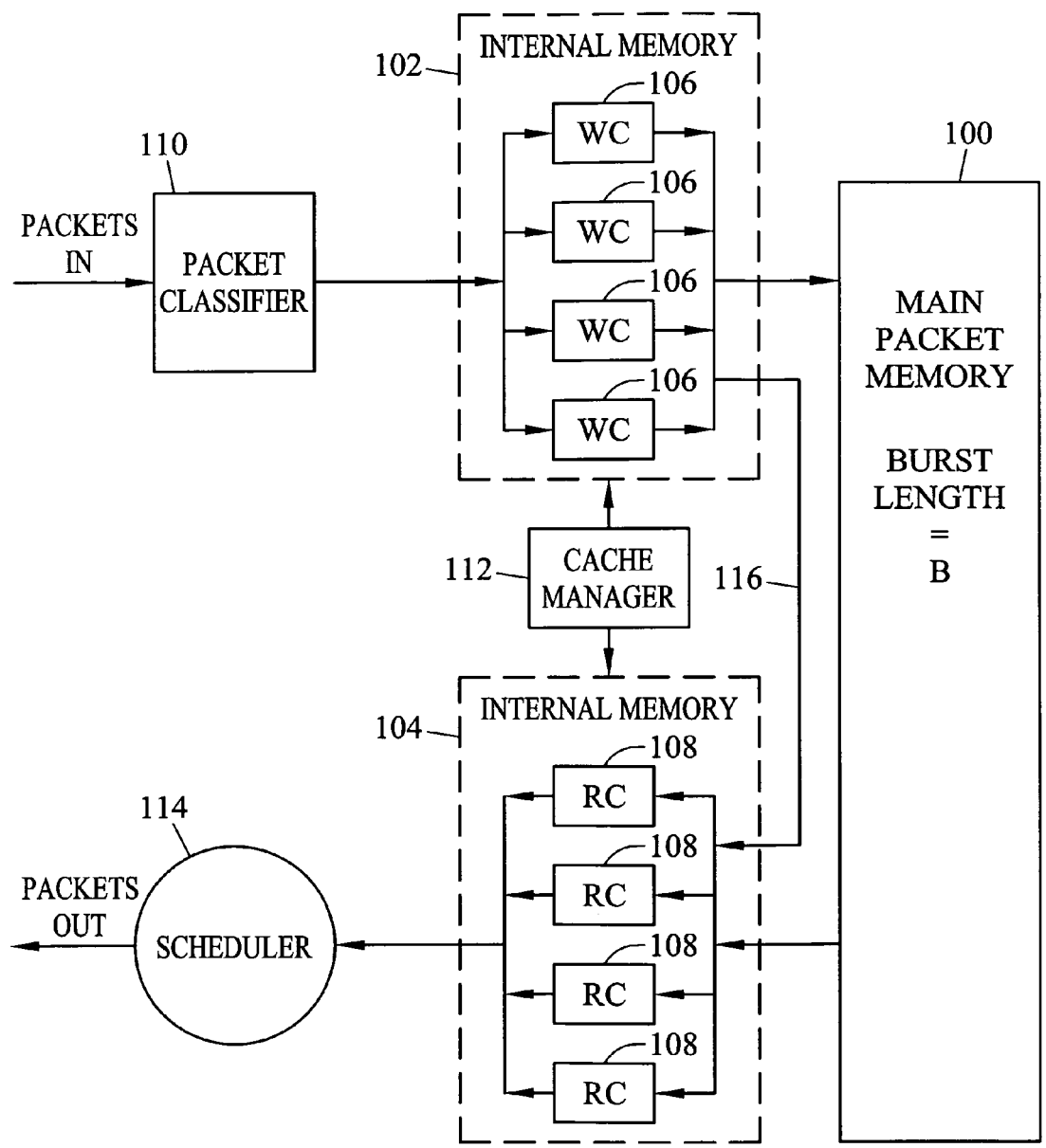
FIG. 1 is a block diagram of an exemplary packet memory system for caching packets to improve utilization of a packet memory according to an embodiment of the subject matter described herein.

FIG. 1 is a block diagram of a system for caching packets to improve utilization of a packet memory according to an embodiment of the subject matter described herein. Referring to FIG. 1, a main packet memory 100 may be used to implement a shared memory switch fabric in a packet forwarding device, such as a layer 2 switch or layer 3 router. Main packet memory 100 may have a burst length equal to B, where B is an integer defined by a user or by physical limitations of main packet memory to ensure efficient utilization of main packet memory 100. For example, if it is desirable to ensure that write and read operations to and from main packet memory are 100% efficient, the burst length may be equal to the width of main packet memory 100 and internal memories 102 and 104 may be structured and/or operated to ensure that the burst length is achieved for every read and write cycle. Main packet memory 100 may be a DRAM or a wide SRAM having a slower random access time relative to internal packet memories 102 and 104. Main packet memory 104 may be external to an ASIC (not shown) that includes internal memories 102 and 104. Although memories 102 and 104 are preferably part of the same ASIC in order to provide a cut-through path for writes directly from memory 102 to memory 104, the present invention is not limited to providing memories 102 and 104 in the same ASIC. In an alternate embodiment, memories 102 and 104 may be provided in separate ASICs or separate stand-alone memory chips.

Internal packet memories 102 and 104 may each be high-speed SRAM memories. More particularly, internal packet memories 102 and 104 are preferably structured and/or operated to achieve a burst length that is at least as great as the burst length of packet memory 100. For example, if main packet memory 100 has a width w and allows one random access every other clock, internal packet memories 102 are preferably either fast enough and/or wide enough to write w packets to main packet memory 100 every other clock.

In the illustrated example, internal memory 102 includes a plurality of write caches 106 for caching packets to be written to main packet memory 100. Similarly, internal memory 104 includes a plurality of read caches 108 for storing packets read from main packet memory 100. In a preferred implementation, each write cache 106 accumulates packets received from a packet classifier 110 on an egress queue basis. For example, packet classifier 110 may be any suitable packet classifier that classifies packets received by a network element, such as a layer 2 switch or a layer 3 router. Such classification may be based on the destination address in the received packet. However, unlike conventional switches, rather than writing each packet directly to main memory and maintaining the egress queues in main memory, packet classifier 110 writes packets to write caches 106. Because each write cache 106 corresponds to an egress queue, packets within each queue are preferably stored in the order in which they are received. In addition, packets preferably exit each write cache 106 in the order which they enter the write cache. As a result, each write cache is a first-in-first-out (FIFO) memory that holds packets to be written to packet memory 100. A cache manager 112 controls accumulation of packets in write caches 106 and writing of packets to packet memory 100 to ensure efficient utilization of packet memory 100 on the write side.

On the read side, a packet is read from an egress queue when it is scheduled by scheduler 114. Scheduler 114 may schedule packets based on any suitable criteria, such as destination port, quality of service, etc. When a packet is scheduled, rather than reading the packet directly from main packet memory 100, a burst length B of packets is written to one of read caches 108. Scheduler 114 then removes the desired packet and sends the packet to the appropriate output port. When the next packet from the same queue as the first packet is requested, rather than accessing packet memory 100, scheduler 114 can simply extract the packet from one of read caches 108 in internal memory 104. As a result, memory bandwidth on the read side is also conserved.

Figure 2:
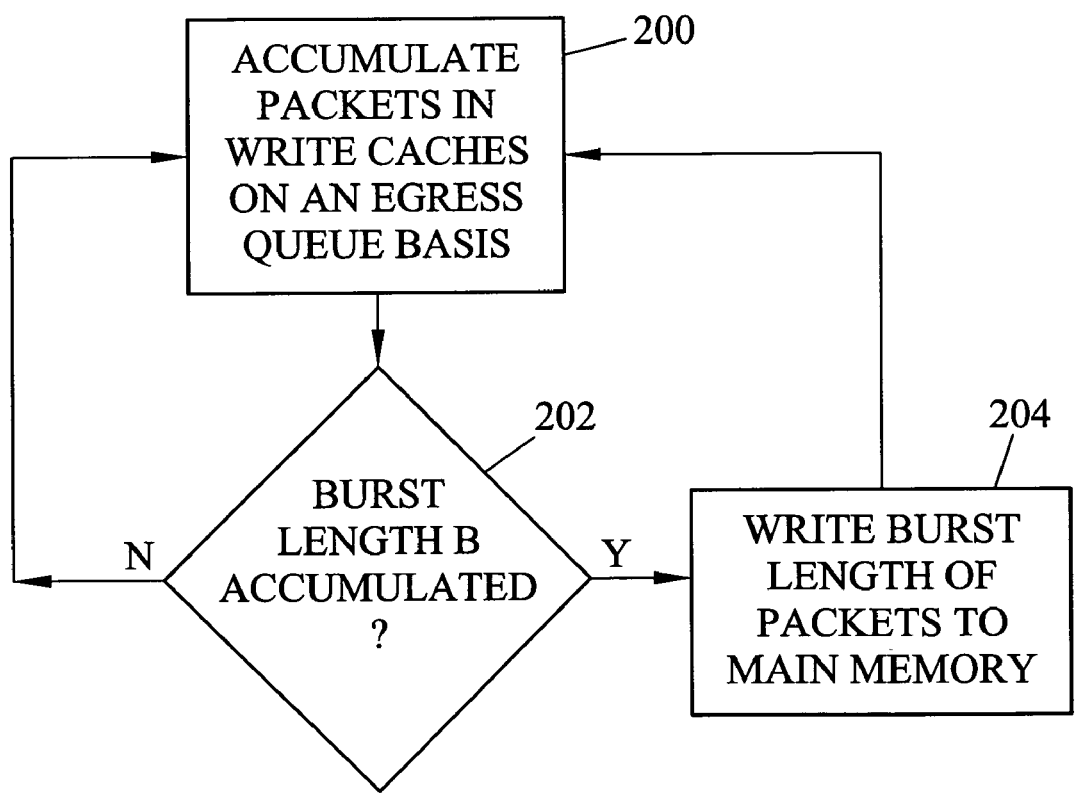
FIG. 2 is a flow chart illustrating exemplary steps for caching packets to be written to a packet memory according to an embodiment of the subject matter described herein.

FIG. 2 is a flow chart illustrating exemplary steps for accumulating packets in write caches 106 and writing packets to packet memory 100 according to an embodiment of the subject matter described herein. Referring to FIG. 2, in step 200, packets are accumulated in write caches 106 on an egress queue basis. As described above, packet classifier 110 may classify each received packet to an egress queue, which is maintained in one of write caches 106. Cache manager 112 controls the accumulation of packets in write caches 106 and the time that the packets will be written to packet memory 100. In step 202, cache manager 112 determines whether any one of write caches 106 has accumulated a burst length of packets. In response to determining that the burst length has been achieved, control proceeds to step 204 where cache manager 112 writes a burst length of packets to packet memory 100. By writing a burst length of packets to packet memory 100, it is meant that the sum of the lengths of the packets writhen to main memory is equal to or substantially equal to the burst length of packet memory 100. If a burst length of packets has not been accumulated in any of write caches 106, control returns to step 200 where packets are continuously accumulated in write caches 106 on an egress queue basis.

Figure 3:
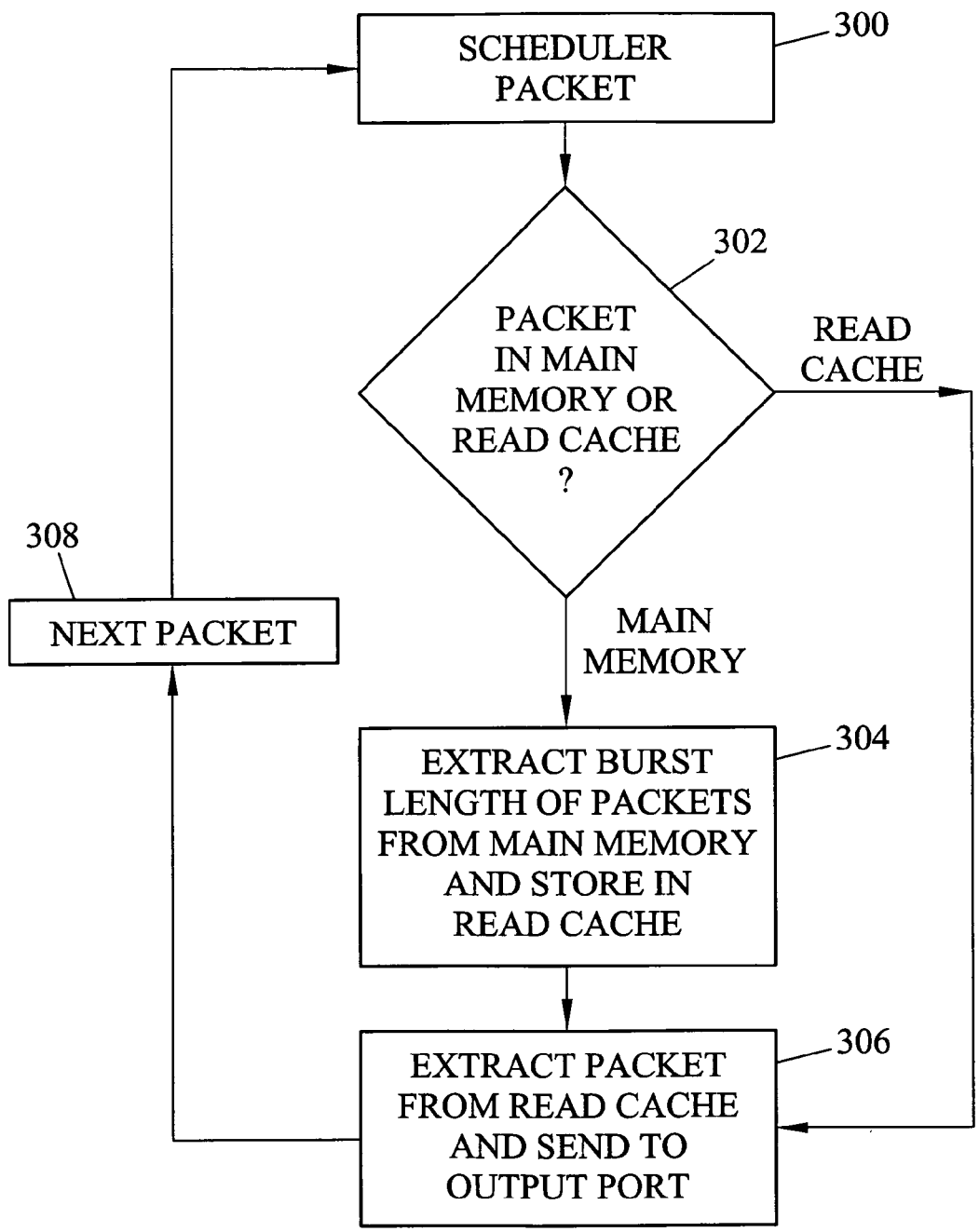
FIG. 3 is a flow chart illustrating exemplary steps for caching packets read from a packet memory according to an embodiment of the subject matter described herein.

FIG. 3 is a flow chart illustrating exemplary steps for reading packets from packet memory 100 in response to a scheduling event. In FIG. 3, it is assumed that packets can only be scheduled once they are in main memory 100 or in one of read caches 108. As will be described in detail below, in an alternate embodiment of the invention, packets may be scheduled as soon as they arrive in one of write caches 106. Referring to FIG. 3, in step 300, scheduler 114 schedules a packet for forwarding to an output port. As described above, such scheduling may be based on any suitable criteria, such as quality of service.

In step 302, it is determined whether the packet is in main packet memory 100 or a read cache. This step may be performed by examining a list of addresses or pointers that indicate the location of each packet in a particular queue or by keeping track of the amount of data associated with each queue in the read cache, packet memory and write caches. If scheduler 114 determines that the packet is in main packet memory 100, control proceeds to step 304 where scheduler 114 extracts a burst length of packets from main packet memory 100 and stores the packets in a read cache. In step 306, scheduler 114 extracts a packet from the read cache and sends the packet to the output port. Control then returns to step 300 via step 308 where the next packet is scheduled.

According to an important aspect of the subject matter described herein, once step 304 is performed, the burst of packets is maintained in the read cache until it is overwritten by another burst. Accordingly, in step 302, when a packet is scheduled and it is determined to be present in a read cache rather than in main packet memory 100, control proceeds to step 306 where the packet is extracted directly from the read cache, rather than from main packet memory 100. Because bursts of packets read from main packet memory are maintained in read caches 108, main memory bandwidth for subsequent accesses to the same burst is conserved.

On the write side, there is no guarantee that a burst length of packets will be accumulated in a particular egress queue within a predetermined time period. If packets are only allowed to be scheduled when they are in main memory 100 or in one of read caches 108, it may be desirable to flush each queue to main memory after a predetermined time period if sufficient main memory bandwidth is available for the flush operation. In an alternate implementation where packets can be scheduled directly from write caches 106, it may be desirable to provide a direct path for packets to be written from a write cache to a read cache in a manner that bypasses main memory.

Figure 4:
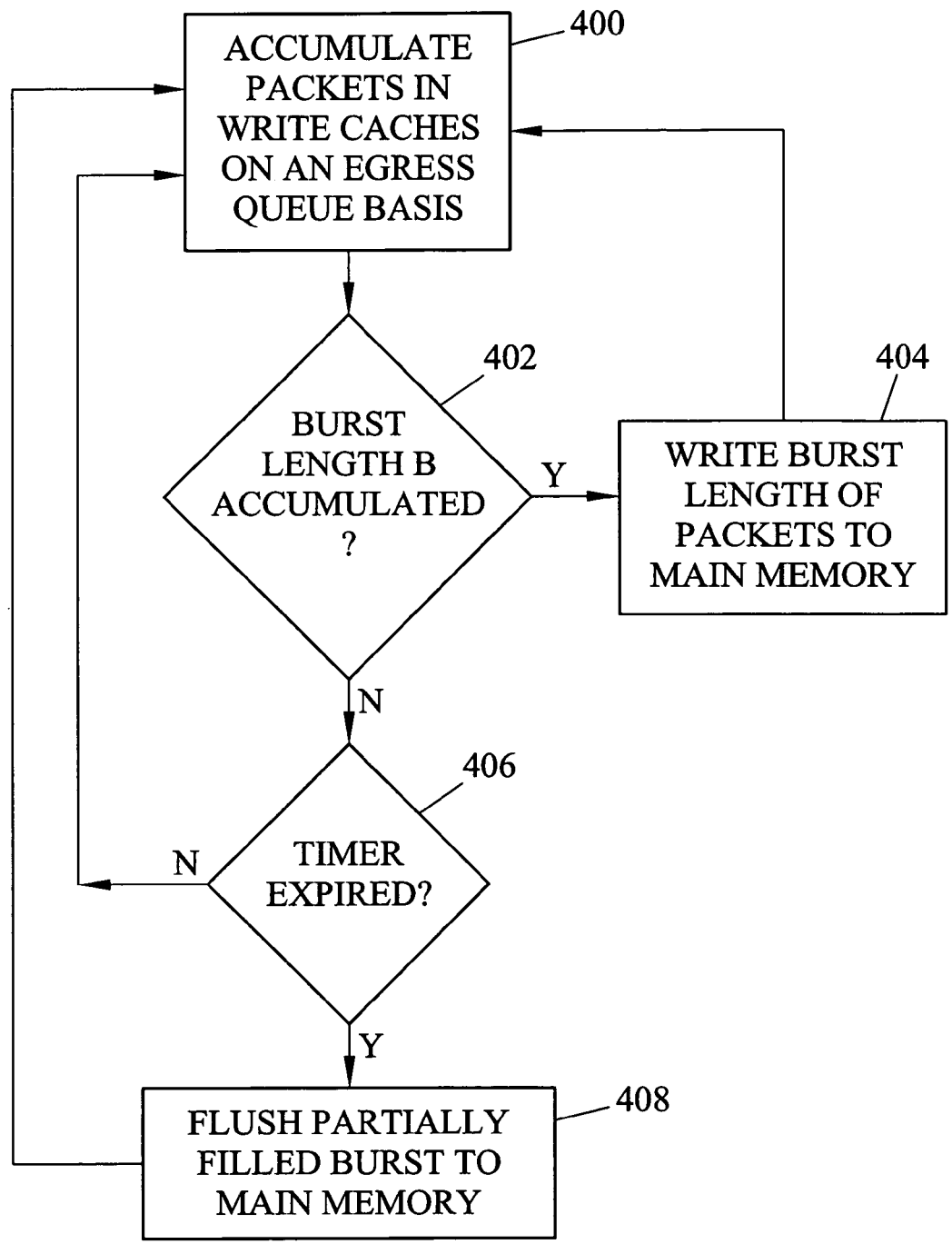
FIG. 4 is a flow chart illustrating an exemplary modification of the process illustrated in FIG. 2 for caching packets to be written to a packet memory according to an embodiment of the subject matter described herein.

FIG. 4 is a flow chart illustrating exemplary steps for flushing a packet from a write cache to main memory in response to expiration of a timer. Referring to FIG. 4, in step 400, packets are accumulated in write caches 106 on an egress queue basis. In step 402, cache manager 112 determines whether a burst length B has been accumulated. If the burst length has been accumulated, control proceeds to step 404 where a burst length of packets is written to main memory.

If a burst length of packets has not been accumulated, control proceeds to step 406 where it is determined whether a timer has expired. Such a timer may be maintained by cache manager 112 on a per egress queue basis for each write cache 106. If the timer has not expired, control returns to step 400 where packets continue to be accumulated. If the timer has expired, control proceeds to step 408 where the partially filled write cache is flushed to main memory.

Figure 5:
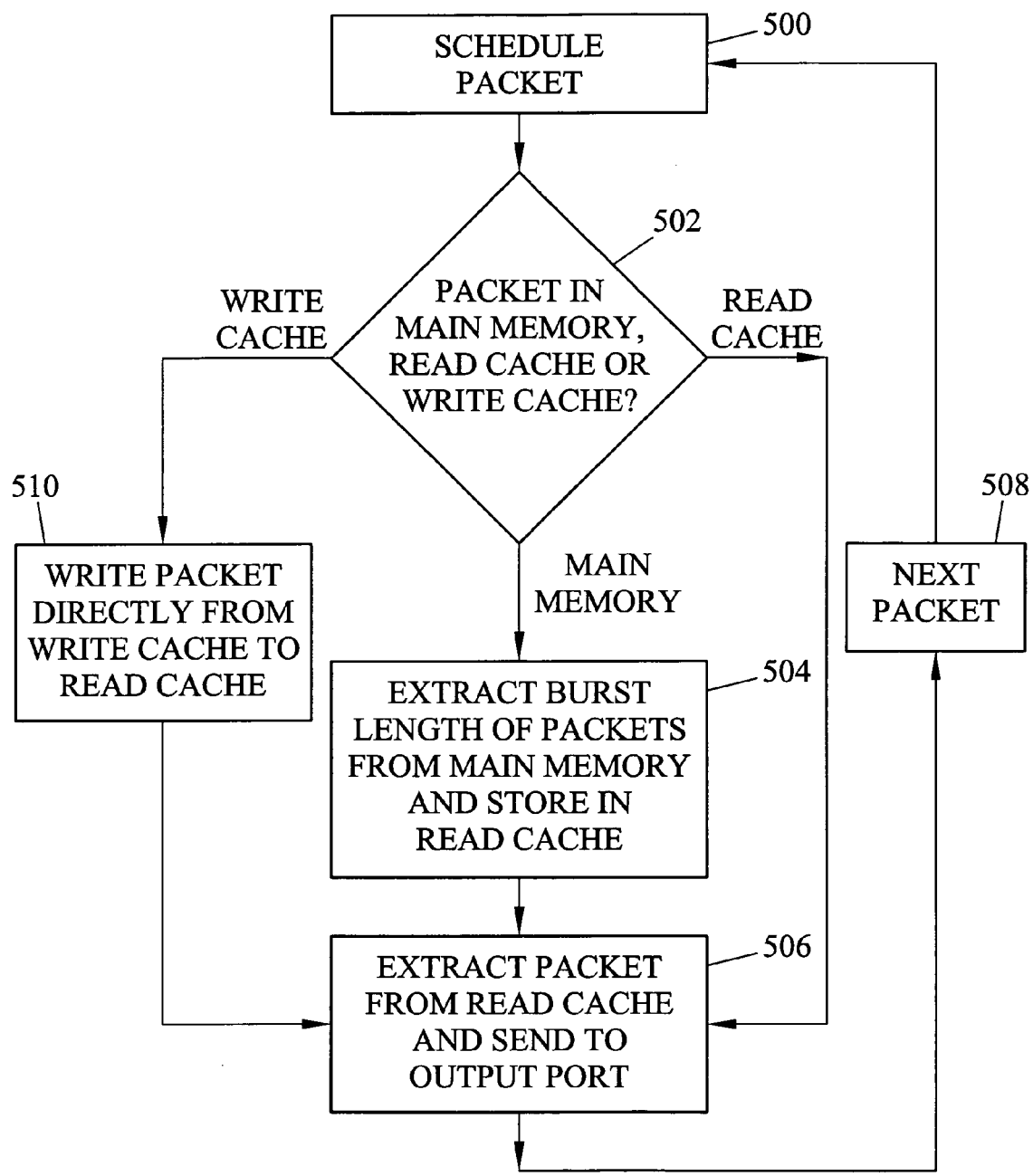
FIG. 5 is a flow chart illustrating an exemplary modification to the process in FIG. 3 for caching packets read from main memory according to an embodiment of the subject matter described herein.

While the solution illustrated in FIG. 4 ensures the packets will be written to main memory within a predetermined time period, there may not be sufficient memory bandwidth on the write side to allow partial writes at intervals determined by timers maintained for each queue. Accordingly, in order to avoid this difficulty, a direct path may be provided where packets can be written directly from a write cache to a read cache in a manner that bypasses main memory. This direct path is illustrated by arrow 116 in FIG. 1. FIG. 5 is a flow chart illustrating exemplary steps for writing packets from a write cache to a read cache in response to a dequeue event. Referring to FIG. 5, in step 500, scheduler 114 schedules a packet. In step 502, scheduler 114 determines whether the packet is in main memory, the read cache or the write cache. If the packet is in main memory, control proceeds to step 504 where a burst length of packets is extracted from main memory and stored in the read cache. Control then proceeds to step 506 where the packet is extracted from the read cache and sent to the output port. Control then returns to step 500 via step 508 where the next packet is scheduled.

Returning to step 502, if the packet is in the read cache, control proceeds to step 506 where the packet is extracted from the read cache and sent to the output port. Control then returns to step 500 via step 508 where the next packet is scheduled.

Returning again to step 502, if the packet is determined to be in a write cache, control proceeds to step 510 where the packet is written directly from the write cache to one of the read caches. Step 510 may be performed by cache manager 112 responsive to a scheduling event by scheduler 114. The packets may traverse cut-through path 116 from internal memory 102 to internal memory 104. Because packets are written directly from the write cache to the read cache, main memory bandwidth is conserved.

According to another aspect of the subject matter described herein, it may be desirable to prevent a packet from being dequeued from a write cache when another packet is about to be written to the same write cache. For example, when a packet accumulation timeout occurs, a write cache may normally be flushed to packet memory, as described above. However, it may not be desirable to flush the write cache if another packet is currently being written to the same cache because greater efficiency would be achieved if the flush operation were delayed until the second write operation to the partially filled queue is complete.

Figure 6:
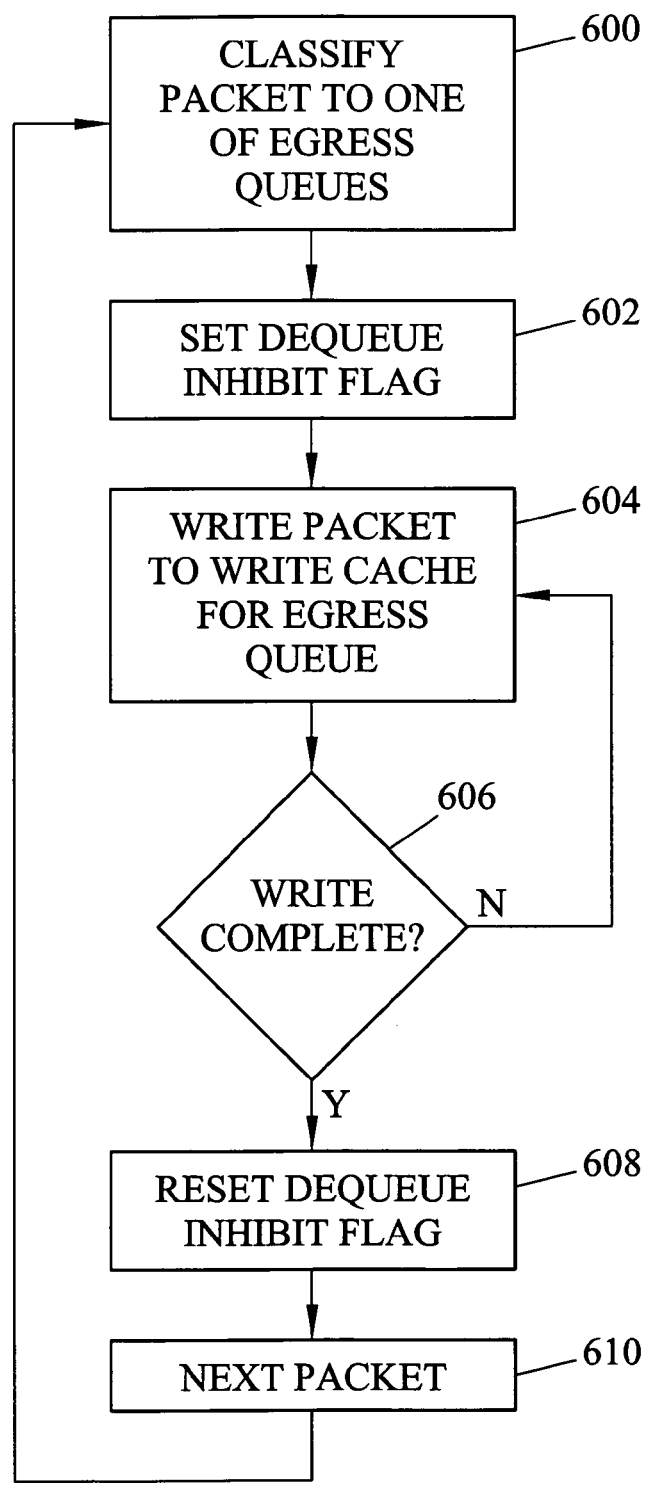
FIG. 6 is a flow chart illustrating exemplary steps for inhibiting a dequeuing operation during writing of a packet to a partially filled egress queue according to an embodiment of the subject matter described herein.

FIG. 6 illustrates exemplary steps that may be performed to inhibit dequeuing during a partial write operation to a partially filled queue when a timeout event occurs. Referring to FIG. 6, in step 600, classifier 110 classifies a packet to one of the egress queues that contains one or more packets from a previous write operation. In step 602, a dequeue inhibit flag is set. This step may be performed by classifier 110 or cache manager 112. Once the dequeue inhibit flag has been set, if a timeout occurs, the packets will not be dequeued until the inhibit flag is reset.

In step 604, the packet is written to the write cache for the egress queue. This step again may be performed by packet classifier 110 or cache manager 112. In step 606, it is determined whether the writing is complete. If the writing is not complete, control returns to step 604 where the writing is continued. If the writing is complete, control proceeds to step 608 where the dequeue inhibit flag is reset. Control then returns to step 600 via step 610 where the next packet is classified and written to one of the egress queues.

Figure 7:
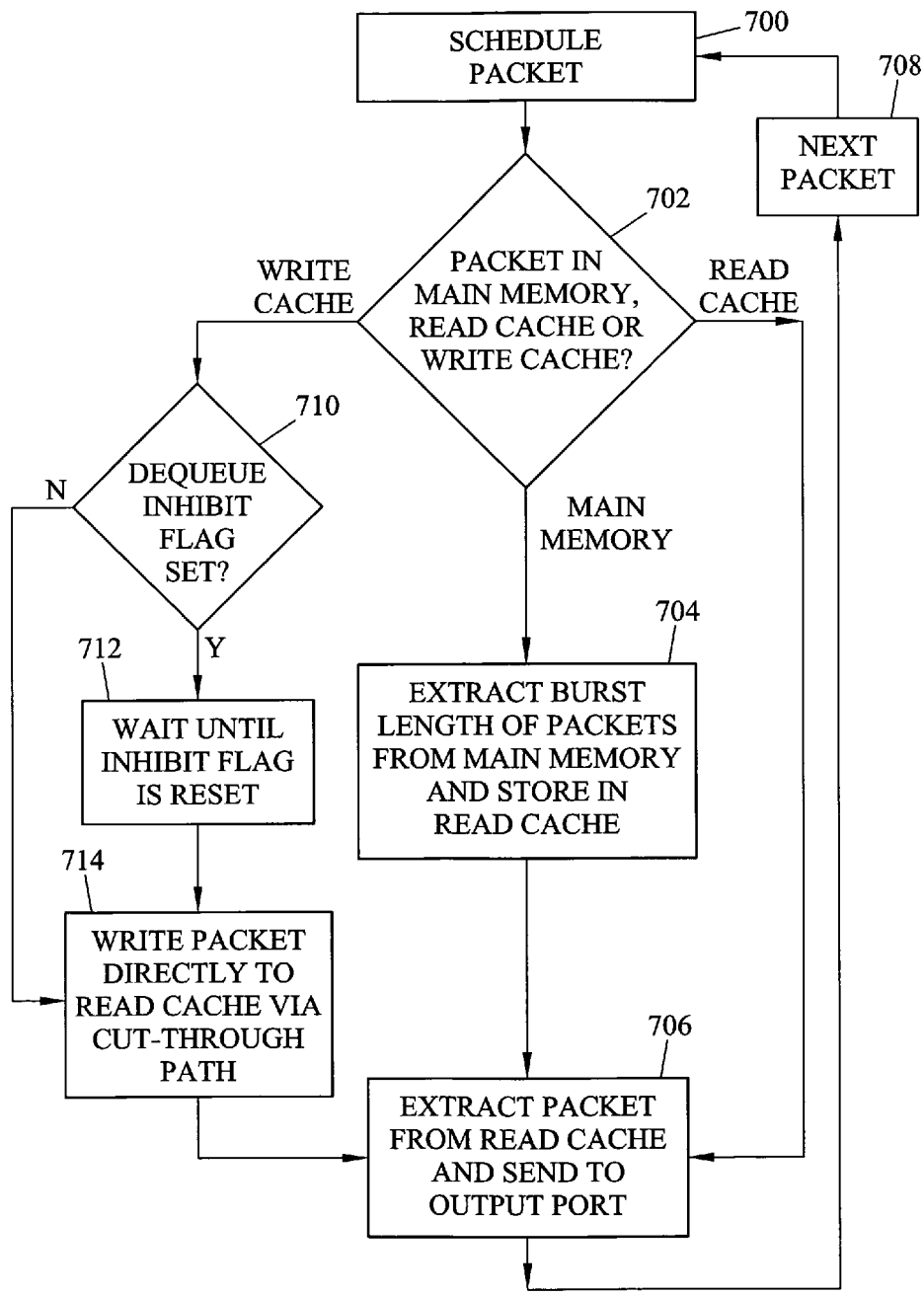
FIG. 7 is a flow chart illustrating exemplary steps for reading packets and checking a dequeue inhibit flag according to an embodiment of the subject matter described herein.

On the read side, the dequeue inhibit flag is preferably checked before a packet is read from a write cache. FIG. 7 illustrates exemplary steps for verifying that a partial write is not in progress when a dequeue event occurs. Referring to FIG. 7, in step 700, a packet is scheduled. In step 702, it is determined whether the packet is in main memory, a read cache, or a write cache. If the packet is in main memory, control proceeds to step 704 where the packet is written to a read cache and step 706 where the packet us extracted from the read cache. If the packet is in a read cache, control proceeds to step 706 where the packet is extracted from the read cache.

If the packet is located in the write cache, a partial write operation may be in progress. Accordingly, from step 702, control proceeds to step 710 where it is determined whether the dequeue inhibit flag is set. If the dequeue inhibit flag is set, control proceeds to step 712 where scheduler 114 waits until the inhibit flag is reset. If the dequeue inhibit flag is not set or if the dequeue inhibit flag resets, control proceeds to step 714 where the packet is written directly to the read cache via the cut-through path. In step 706, the packet is extracted from the read cache and sent to the appropriate output port.

In the methods and systems described above, the packets are classified to the write caches on an egress queue basis. For unicast packets, classifying packets to an egress queue is a simple operation because each unicast packet is assigned to a single egress queue. However, for a multicast packet by definition will be assigned to multiple egress queues. Accordingly, one method for handling a multicast packet is to assign the packet to each egress queue to which the packet is destined. However, this solution may waste main memory bandwidth.

Figure 8:
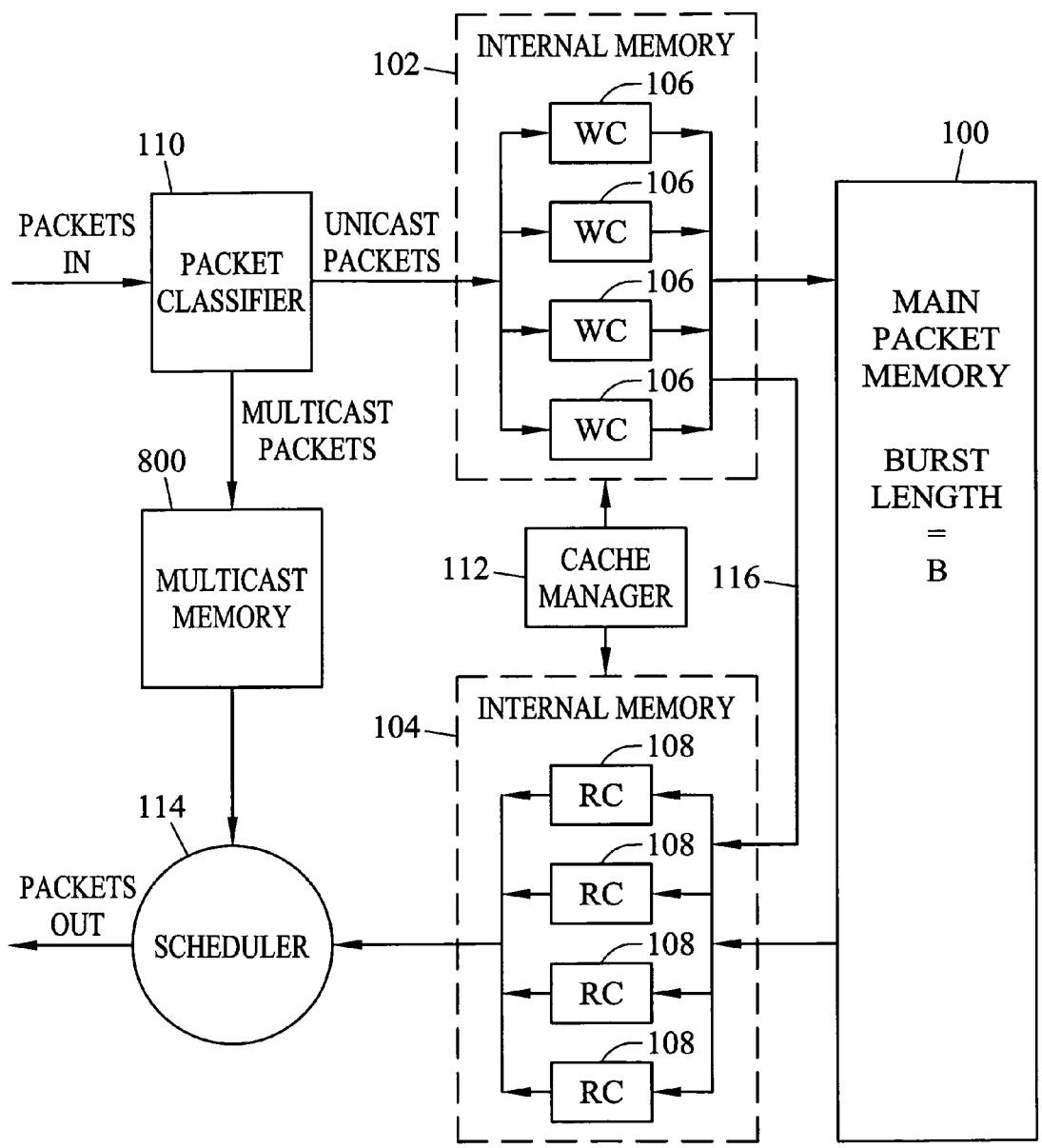
FIG. 8 is a block diagram of a system for caching packets to improve utilization of a packet memory using a separate internal memory for multicast packets according to an embodiment of the subject matter described herein.

An alternate solution for processing multicast packets is illustrated in FIG. 8. In FIG. 8, packet classifier 110 classifies unicast packets to write caches 106 using any of the methods described above. Multicast packets may be classified and sent a multicast memory 800. Packets may be scheduled directly from multicast memory 800 in a manner that bypasses main memory 100. Main memory 800 may be an internal memory, i.e., internal to the same chip that includes internal memories 102 and 104. Providing a separate memory for handling multicast packets prevents such packets from affecting the caching scheme for unicast packets described above. That is, unicast packets may be cached on the read and write sides of main memory using any of the variations described above. Multicast packets bypass this mechanism using memory 800.

Figure 9:
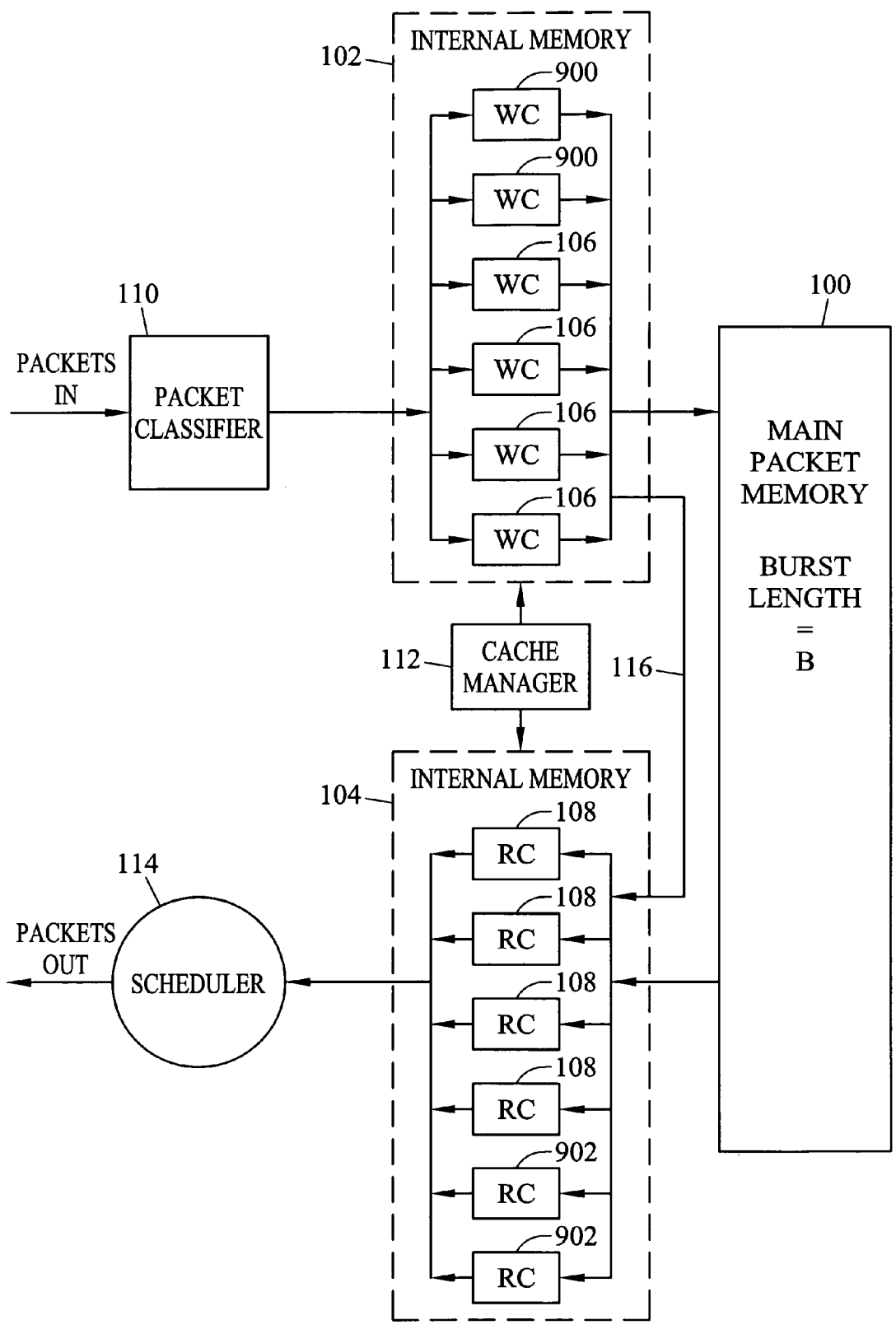
FIG. 9 is a block diagram of a system for caching packets to improve utilization of a packet memory using read and write multicast packet caches according to an embodiment of the subject matter described herein.

Using a separate internal memory for multicast packets without caching for these packets is efficient if multicast traffic is a small percentage of overall traffic. However, if multicast traffic represents a substantial portion of total traffic, the size of the multicast memory may become cost-prohibitive. In this situation, a caching scheme may be utilized for multicast packets. An alternate configuration for handling multicast packets is illustrated in FIG. 9. In FIG. 9, internal memories 102 and 104 may each include a plurality of read caches and write caches as described above. However, on both the read and write sides, one or more caches may be provided to exclusively handle multicast packets. In the illustrated example, internal memory 102 includes write caches 900 that are configured to receive multicast packets and internal memory 104 includes read caches 902 that are configured to receive multicast packets on the read side. In one implementation, a single multicast cache may be included on the read side and on the write side. In such an implementation, packet classifier 110 would classify all multicast packets to the same multicast queue on the write side. This would conserve memory bandwidth on the write side. However, on the read side efficiency would not be achieved, since there is no guarantee based on the scheduling algorithm that packets would be read from main memory 100 in the same order in which they were written.

In order to avoid this difficulty, a pool of multicast caches may be provided on both the read and write side as illustrated in FIG. 9. Ideally, one multicast queue would be provided for each possible multicast stream in a network. However, in light of the number of possible multicast streams in a network, this solution would undesirably increase the size of memories 102 and 104. Accordingly, a predetermined number of read and write caches may be maintained for a multicast queues, and packets for different multicast streams may be alternatingly written to write caches 900 on a load sharing basis. For example, on the write side, packet classifier 110 may classify packets associated with the first multicast stream to one of the multicast write caches 900. When packets for another multicast stream arrive, these packets may be stored in another of the multicast write caches 900. If the number of concurrent multicast streams exceeds the number of multicast write caches, packets from the oldest multicast write cache may be written to main memory and the corresponding write cache may be used for the next new stream.

The load sharing scheme described in the preceding paragraph will function as long as there is adequate bandwidth to flush the oldest multicast write cache. In an alternate implementation, multicast traffic from different streams may be interleaved in the write caches. This will lead to inefficiencies on the read side. However, write-side efficiency will still be achieved and multiple concurrent multicast streams may be serviced, even when the number of concurrent streams exceeds the number of multicast queues.

On the read side, a similar function may be performed. That is, multicast packets associated with the stream that is scheduled may be burst from main memory. As long as the number of multicast streams that have been scheduled is less than the total number of multicast read caches, new multicast packets burst from main memory can be written to the next available read cache or the read cache associated with the write cache used, assuming a 1 to 1 mapping between read and write caches. If the number multicast streams that are scheduled exceeds the number the number of read caches, packets in a particular read cache can be overwritten.

Thus, the present invention includes methods and systems for caching packets written to and read from a packet memory. Packets are accumulated in write caches so that the burst length of a memory can be achieved during each read and write operation. On the read side, read caches allow packets to be burst from main memory and stored so that subsequent accesses do not affect main memory bandwidth.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for caching packets to improve utilization of a packet memory, the system comprising:

(a) a packet memory having a burst length B, B being an integer defined by a user or by physical limitations of the packet memory to ensure efficient utilization of the packet memory;

(b) a plurality of write caches associated with the packet memory for storing packets to be written to the packet memory, each write cache corresponding to an egress queue;

(c) a packet classifier for classifying packets to one of the egress queues and writing each packet to the corresponding write cache; and (d) a cache manager for monitoring the size of each of the egress queues and for writing packets from one of the plurality of write caches to the packet memory in response to accumulation of the burst length B packets in the one write cache, and, in response to failing to accumulate the burst length B of packets in any of write caches, continuing to accumulate packets in the write caches on an egress queue basis.

2. The system of claim 1 wherein the packet memory comprises a dynamic random access memory (DRAM) and the write cache comprises a static random access memory (SRAM).

3. A system for caching packets to improve utilization of a packet memory, the system comprising:

(a) a packet memory having a burst length B, B being an integer;

(b) a plurality of write caches associated with the packet memory for storing packets to be written to the packet memory, each write cache corresponding to an egress queue;

(c) a packet classifier for classifying packets to one of the egress queues and writing each packet to the corresponding write cache; and (d) a cache manager for monitoring the size of each of the egress queues and for writing packets from one of the plurality of write caches to the packet memory in response to accumulation of a burst length B of packets in the one write cache, wherein the packet memory comprises a static random access memory (SRAM) of a first size and a first random access time and wherein the plurality of write caches are implemented using a second SRAM having a second size less than the first size and a random access time less than the first random access time.

4. A system for caching packets to improve utilization of a packet memory, the system comprising:

(a) a packet memory having a burst length B, B being an integer;

(b) a plurality of write caches associated with the packet memory for storing packets to be written to the packet memory, each write cache corresponding to an egress queue;

(c) a packet classifier for classifying packets to one of the egress queues and writing each packet to the corresponding write cache; and (d) a cache manager for monitoring the size of each of the egress queues and for writing packets from one of the plurality of write caches to the packet memory in response to accumulation of a burst length B of packets in the one write cache, wherein the cache manager is adapted to maintain a timer for each of the write caches, and in response to expiration of the timer for the first write cache, the cache manager is adapted to write packets from the one write cache to the packet memory.

5. A system for caching packets to improve utilization of a packet memory, the system comprising:

(a) a packet memory having a burst length B, B being an integer;

(b) a plurality of write caches associated with the packet memory for storing packets to be written to the packet memory, each write cache corresponding to an egress queue;

(c) a packet classifier for classifying packets to one of the egress queues and writing each packet to the corresponding write cache;

(d) a cache manager for monitoring the size of each of the egress queues and for writing packets from one of the plurality of write caches to the packet memory in response to accumulation of a burst length B of packets in the one write cache;

(e) a plurality of read caches operatively associated with the packet memory for storing packets read from the packet memory, each of the read caches being capable of storing at least a burst length B of packets; and (f) a scheduler for scheduling packets, wherein, responsive to a scheduling event, a burst length B of packets is written from the packet memory to one of the read caches.

6. The system of claim 5 wherein the cache manager is adapted to retain the burst length B of packets in the one read cache until the one read cache is over-written.

7. The system of claim 6 wherein, in response to a second scheduling event for one of the packets in the one read cache, the scheduler is adapted to extract the packets from the one read cache.

8. The system of claim 5 comprising a cut-through path between the one write cache and the one read cache, wherein the cache manager is adapted to write packets from the one write cache to the one read cache responsive to a dequeue event that occurs for a packet in the one write cache.

9. The system of claim 8 wherein the cache manager is adapted to inhibit extraction of existing packets from the one write cache during writing of packets to the one write cache and wherein the cache manager is adapted to delay extraction of the packets from the write cache while the reading is inhibited.

10. A system for caching packets to improve utilization of a packet memory, the system comprising:

(a) a packet memory having a burst length B, B being an integer;

(b) a plurality of write caches associated with the packet memory for storing packets to be written to the packet memory, each write cache corresponding to an egress queue;

(c) a packet classifier for classifying packets to one of the egress queues and writing each packet to the corresponding write cache;

(d) a cache manager for monitoring the size of each of the egress queues and for writing packets from one of the plurality of write caches to the packet memory in response to accumulation of a burst length B of packets in the one write cache, and, in response to failing to accumulate the burst length B of packets in any of write caches, continuing to accumulate packets in the write caches on an egress queue basis; and (e) a multicast memory for storing multicast packets, wherein the packet classifier is adapted to classify multicast packets to the multicast memory.

11. A system for caching packets to improve utilization of a packet memory, the system comprising:

(a) a packet memory having a burst length B, B being an integer;

(b) a plurality of write caches associated with the packet memory for storing packets to be written to the packet memory, each write cache corresponding to an egress queue;

(c) a packet classifier for classifying packets to one of the egress queues and writing each packet to the corresponding write cache;

(d) a cache manager for monitoring the size of each of the egress queues and for writing packets from one of the plurality of write caches to the packet memory in response to accumulation of a burst length B of packets in the one write cache; and (e) at least one multicast write cache and at least one multicast read cache for respectively storing multicast packets to be written to the packet memory and multicast packets read from the packet memory.

12. A method for caching packets to improve utilization of packet memory, the method comprising:

(a) accumulating packets in a plurality of write caches on an egress queue basis;

(b) determining whether a queue stored in one of the write caches has a size that is equal to at least a burst length of a packet memory, the burst length being an integer B defined by a user or by physical limitations of the packet memory to ensure efficient utilization of the packet memory;

(c) in response to determining that the size of the queue is equal to at least the burst length B, writing B packets from the one write cache to the packet memory; and (d) in response to failing to accumulate B packets in any of the write caches, continuing to accumulate packets in the write caches on an egress queue basis.

13. The method of claim 12 wherein accumulating packets in a plurality of write caches includes accumulating packets in a dynamic random access memory (DRAM) and wherein writing the packets in the queue to the packet memory includes writing the packets to a static random access memory (SRAM).

14. The method of claim 12 comprising, responsive to a scheduling event, writing a burst length of packets from the packet memory to a read cache operatively associated with the packet memory.

15. The method of claim 12 comprising, in response to a scheduling event for a packet in the one write cache, writing the packet directly to a read cache.

16. The method of claim 14 comprising maintaining the burst length of packets in the read cache.

17. A method for caching packets to improve utilization of packet memory, the method comprising:

(a) accumulating packets in a plurality of write caches on an egress queue basis;

(b) determining whether a queue stored in one of the write caches has a size that is equal to at least a burst length of a packet memory; and (c) in response to determining that the size of the queue is equal to at least the burst length, writing a burst length of packets from the one write cache to the packet memory, wherein accumulating packets in a plurality of write caches includes accumulating packets in a static random access memory (SRAM) having a first random access time and a first size and wherein writing the packets form the queue to the packet memory includes writing the packets to a second SRAM having a second size greater than the first size and a second random access time that is greater than the first random access time.

18. A method for caching packets to improve utilization of packet memory, the method comprising:

(a) accumulating packets in a plurality of write caches on an egress queue basis;

(b) determining whether a queue stored in one of the write caches has a size that is equal to at least a burst length of a packet memory;

(c) in response to determining that the size of the queue is equal to at least the burst length, writing a burst length of packets from the one write cache to the packet memory;

(d) maintaining a timer for each of the write caches, and, in response to expiration of the timer for the one write cache, writing packets from the one write cache to the packet memory.

19. A method for caching packets to improve utilization of packet memory, the method comprising:

(a) accumulating packets in a plurality of write caches on an egress queue basis;

(b) determining whether a queue stored in one of the write caches has a size that is equal to at least a burst length of a packet memory; and (c) in response to determining that the size of the queue is equal to at least the burst length, writing a burst length of packets from the one write cache to the packet memory, responsive to a scheduling event, writing a burst length of packets from the packet memory to a read cache operatively associated with the packet memory, maintaining the burst length of packets in the read cache, and, responsive to a second scheduling event for one of the packets in the read cache, extracting the packet from the read cache.

20. A method for caching packets to improve utilization of packet memory, the method comprising:

(a) accumulating packets in a plurality of write caches on an egress queue basis;

(b) determining whether a queue stored in one of the write caches has a size that is equal to at least a burst length of a packet memory; and (c) in response to determining that the size of the queue is equal to at least the burst length, writing a burst length of packets from the one write cache to the packet memory, inhibiting extraction of existing packets from the one write cache during writing of a packet to the one write cache.

21. A method for caching packets to improve utilization of packet memory, the method comprising:

(a) accumulating packets in a plurality of write caches on an egress queue basis;

(b) determining whether a queue stored in one of the write caches has a size that is equal to at least a burst length of a packet memory;

(c) in response to determining that the size of the queue is equal to at least the burst length, writing a burst length of packets from the one write cache to the packet memory, wherein accumulating packets in a plurality of write caches includes accumulating multicast packets in a multicast memory separate from the packet memory and the write caches; and (d) in response to failing to accumulate B packets in any of the write caches, continuing to accumulate packets in the write caches on an egress queue basis.

22. A method for caching packets to improve utilization of packet memory, the method comprising:

(a) accumulating packets in a plurality of write caches on an egress queue basis;

(b) determining whether a queue stored in one of the write caches has a size that is equal to at least a burst length of a packet memory; and (c) in response to determining that the size of the queue is equal to at least the burst length, writing a burst length of packets from the one write cache to the packet memory; and (d) maintaining at least one multicast write cache for caching multicast packets to be written to the packet memory and at least one multicast read cache for storing multicast packets read from the packet memory.

23. A computer-readable medium having stored thereon computer readable instructions that when executed by a processor of a computer perform steps comprising:

(a) accumulating packets in a plurality of write caches on an egress queue basis;

(b) determining whether a queue stored in one of the write caches has a size that is equal to at least a burst length of a packet memory the burst length being an integer B defined by a user or by physical limitations of the packet memory to ensure efficient utilization of the packet memory; and (c) in response to determining that the size of the queue is equal to at least the burst length B, writing B packets from the one write cache to the packet memory, and, in response to failing to accumulate the burst length B of packets in any of write caches, continuing to accumulate packets in the write caches on an egress queue basis.

24. The computer readable medium of claim 23 wherein accumulating packets in a plurality of write caches includes accumulating packets in a dynamic random access memory (DRAM) and wherein writing the packets in the queue to the packet memory includes writing the packets to a static random access memory (SRAM).

25. The computer readable medium of claim 23 comprising, responsive to a scheduling event, writing a burst length of packets from the packet memory to a read cache operatively associated with the packet memory.

26. The computer readable medium of claim 25 comprising maintaining the burst length of packets in the read cache.

27. A computer readable medium having stored thereon computer-executable instructions that when executed by a processor of a computer steps comprising:

(a) accumulating packets in a plurality of write caches on an egress queue basis;

(b) determining whether a queue stored in one of the write caches has a size that is equal to at least a burst length of a packet memory; and (c) in response to determining that the size of the queue is equal to at least the burst length, writing a burst length of packets from the one write cache to the packet memory, wherein accumulating packets in a plurality of write caches includes accumulating packets in a static random access memory (SRAM) having a first random access time and a first size and wherein writing the packets form the queue to the packet memory includes writing the packets to a second SRAM having a second size greater than the first size and a second random access time that is greater than the first random access time.

28. A computer readable medium having stored thereon computer-executable instructions that when executed by a processor of a computer steps comprising:

(a) accumulating packets in a plurality of write caches on an egress queue basis;

(b) determining whether a queue stored in one of the write caches has a size that is equal to at least a burst length of a packet memory;

(c) in response to determining that the size of the queue is equal to at least the burst length, writing a burst length of packets from the one write cache to the packet memory; and (d) maintaining a timer for each of the write caches, and, in response to expiration of the timer for the one write cache, writing packets from the one write cache to the packet memory.

29. A computer readable medium having stored thereon computer-executable instructions that when executed by a processor of a computer steps comprising:

(a) accumulating packets in a plurality of write caches on an egress queue basis;

(b) determining whether a queue stored in one of the write caches has a size that is equal to at least a burst length of a packet memory; and (c) in response to determining that the size of the queue is equal to at least the burst length, writing a burst length of packets from the one write cache to the packet memory, responsive to a scheduling event, writing a burst length of packets from the packet memory to a read cache operatively associated with the packet memory, maintaining the burst length of packets in the read cache, and, responsive to a second scheduling event for one of the packets in the read cache, extracting the packet from the read cache.

30. A computer readable medium having stored thereon computer-executable instructions that when executed by the processor of a computer perform steps comprising:

(a) accumulating packets in a plurality of write caches on an egress queue basis;

(b) determining whether a queue stored in one of the write caches has a size that is equal to at least a burst length of a packet memory; and (c) in response to determining that the size of the queue is equal to at least the burst length, writing a burst length of packets from the one write cache to the packet memory, in response to a scheduling event for a packet in the one write cache, writing the packet directly to a read cache.

31. A computer readable medium having stored thereon computer-executable instructions that when executed by a processor of a computer steps comprising:

(a) accumulating packets in a plurality of write caches on an egress queue basis;

(b) determining whether a queue stored in one of the write caches has a size that is equal to at least a burst length of a packet memory; and (c) in response to determining that the size of the queue is equal to at least the burst length, writing a burst length of packets from the one write cache to the packet memory, inhibiting extraction of existing packets from the one write cache during writing of a packet to the one write cache.

32. A computer readable medium having stored thereon computer-executable instructions that when executed by a processor of a computer steps comprising:

(a) accumulating packets in a plurality of write caches on an egress queue basis;

(b) determining whether a queue stored in one of the write caches has a size that is equal to at least a burst length of a packet memory;

(c) in response to determining that the size of the queue is equal to at least the burst length, writing a burst length of packets from the one write cache to the packet memory, wherein accumulating packets in a plurality of write caches includes accumulating multicast packets in a multicast memory separate from the packet memory and the write caches; and (d) in response to failing to accumulate B packets in any of the write caches, continuing to accumulate packets in the write caches on an egress queue basis.

33. A computer readable medium having stored thereon computer-executable instructions that when executed by a processor of a computer steps comprising:

(a) accumulating packets in a plurality of write caches on an egress queue basis;

(b) determining whether a queue stored in one of the write caches has a size that is equal to at least a burst length of a packet memory; and (c) in response to determining that the size of the queue is equal to at least the burst length, writing a burst length of packets from the one write cache to the packet memory; and (d) maintaining at least one multicast write cache for caching multicast packets to be written to the packet memory and at least one multicast read cache for storing multicast packets read from the packet memory.

* * * * *

UNITED STATES PATENT AND TRADEMARK OFFICE
CERTIFICATE OF CORRECTION

PATENT NO. : 7,606,249 B1
APPLICATION NO. : 11/018132
DATED : October 20, 2009
INVENTOR(S) : Erik R. Swenson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 852 days.

Signed and Sealed this

Fifth Day of October, 2010

David J. Kappos
*Director of the United States Patent and Trademark Office*